Patented Sept. 12, 1944

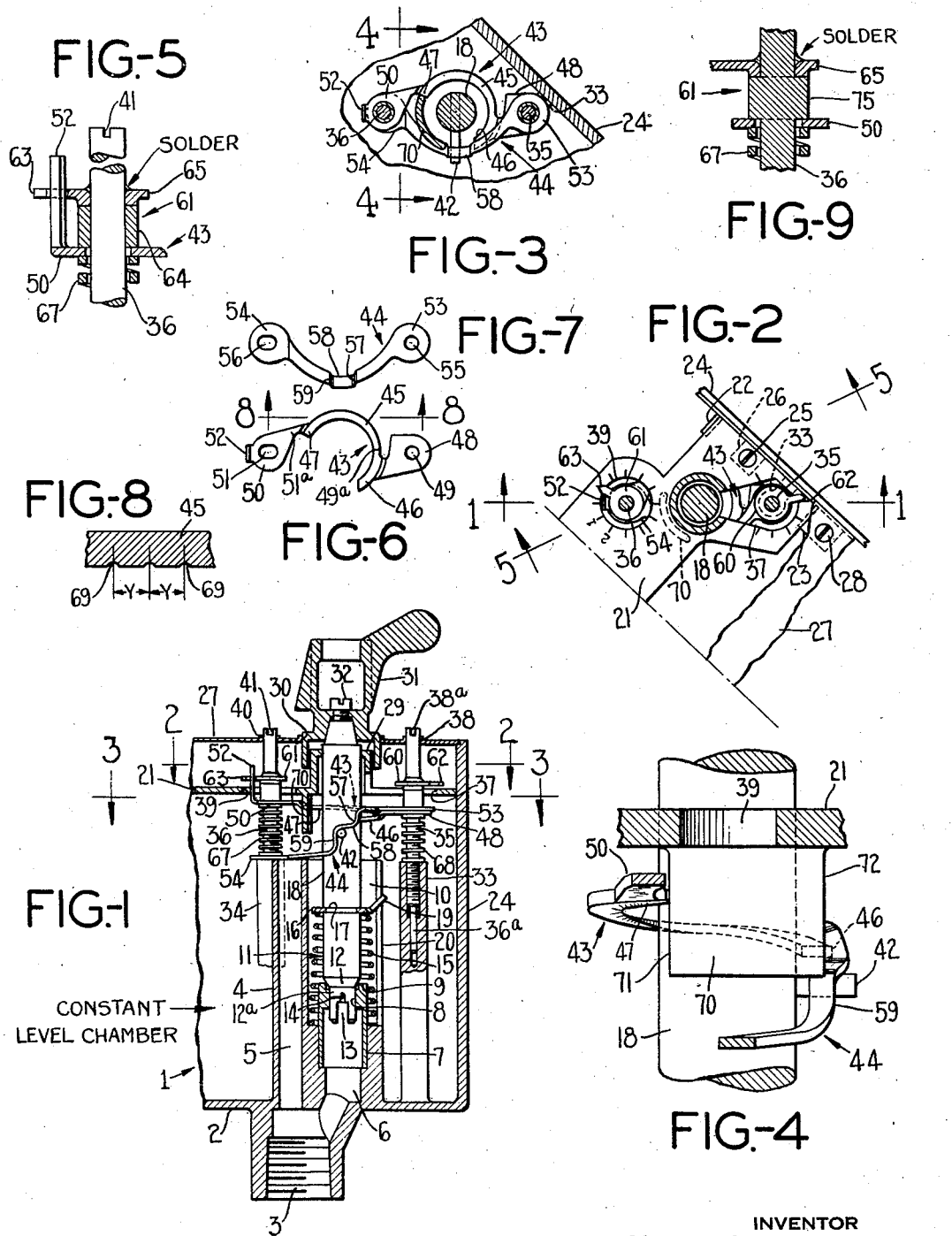

2,358,040

UNITED STATES PATENT OFFICE 2,358,040

METERING VALVE

Charles M. Williams, Detroit, Mich., assignor to Detroit Lubricator Company, Detroit, Mich., a corporation of Michigan Application March 24, 1941, Serial No. 384,921

18 Claims. (Cl. 137—21)

This invention relates to new and useful improvements in metering valves and more particularly to a valve for regulating the flow of liquid such as oil fuel from a constant level chamber to the burner of a heating apparatus.

An object of the invention is to provide novel cam means for the operation of a valve member.

Another object is to provide means for establishing a minimum open position for the valve member.

Another object is to provide means for establishing a maximum open position for the valve member.

Another object is to provide means for adjusting the minimum open position which the valve member may have relative to the established minimum open position of the valve member.

Another object is to provide means for adjusting the maximum open position which the valve member may have relative to the established maximum open position of the valve member.

Another object is to provide a valve structure in which the operating mechanism is housed within a casing but is adjustable from the external of the casing.

Another object is to provide novel means for locking or holding the valve member in closed position.

The invention consists in the improved construction and combination of parts, to be more fully described hereinafter and the novelty of which will be particularly pointed out and distinctly claimed.

In the accompanying drawing, to be taken as a part of this specification, a preferred embodiment of the invention is fully and clearly shown, in which drawing—

Figure 1 is a view in vertical section through a constant level chamber showing the valve of the invention and taken substantially on the line 1—1 of Fig. 2;

Fig. 2 is a view in section on the line 2—2 of Fig. 1;

Fig. 3 is a view in section on the line 3—3 of Fig. 1 and showing the cam means in plan view;

Fig. 4 is an enlarged detail view showing the cooperation of certain stop means with the cam means and taken on the line 4—4 of Fig. 3;

Fig. 5 is an enlarged detail view of certain cam supporting and adjusting means and taken on the line 5—5 of Fig. 2;

Fig. 6 is a detail plan view of a cam track member;

Fig. 7 is a detail plan view of another cam track member which is cooperable with the member of Fig. 6;

Fig. 8 is a detail view in section on the line 8—8 of Fig. 6 and showing the cam track serrations or follower positioning notches, and Fig. 9 is an enlarged detail view in section of another form of cam supporting and adjusting means, being a modification of Fig. 5.

Referring to the drawing the numeral 1 designates the casing of a constant level chamber having an inlet (not shown) which may be controlled by a float operated valve and having in its bottom wall 2 an outlet 3 preferably screw-threaded for connection to a liquid supply line leading to a burner or the like. Extending upward within the casing from its bottom wall there is a valve housing or casing 4 having a vertically extending vent duct 5 communicating with the outlet 3 and terminating at its upper end above the liquid level in the chamber. The valve casing 4 has an outlet passageway 6 leading to the outlet 3 and having its inlet end provided with a valve seat member 7 provided with an outlet port 8 having a surrounding annular valve seat 9. The valve casing 4 has a tubular sleeve member 10 extending upward around and laterally spaced from the seat member 7 and terminating above the liquid level within the chamber. Within the sleeve member 10 there is a metering valve member 11 having a conical portion 12 engageable with the seat 9 to close the outle passageway 6. The valve member 11 also has a cylindrical end portion 12ª which fits the port 8 and has one or more metering slots 13 with a communicating pilot slot 14, which slots cooperate with the wall of the port 8 to regulate or meter flow from the chamber. A helical coil spring 15 surrounds the valve member 11 and the seat member 7 and acts upward against a collar or flange 16 on the valve member to urge the valve member toward open position. The collar 16 is rotatably supported in an annular groove 17 in the valve stem 18 and has a finger 19 slidably fitting and guided within a vertical slot 20 through the wall of the sleeve member 10 to hold the collar 16 against rotation upon rotation of the stem 18. The slot 20 provides an inlet to the valve casing and port 8 for flow from the constant level chamber.

Overlying the housing 4 and spaced thereabove, there is a bridge or supporting member 21 which extends across the chamber and is supported at its ends or sides (of which but one is shown) upon spaced stepped bosses or posts 22, 23 projecting inward from the side wall 24 of casing 1.

The bridge member 21 may be secured in position by screws 25 threaded into posts or bosses 26 on the casing 1. Overlying and spaced above the bridge member 21 there is a cover member 27 which closes the top of and provides a top wall for the casing 1 and which may be secured in position by a screw 28 threaded into the boss 23, for example. The bridge member 21 has an upstanding tubular guide member 29 concentric with an aperture through the bridge member and aligning with the port 8. The stem 18 extends upward through the bridge member aperture and the guide member 28 in which it is rotatably and reciprocally guided. Through the cover member 27 there is an aperture 30 aligned with the guide member and port 8 and through which extends the upper end of stem 18 and the sleeve like portion of a hand grip member 31 which is secured to the stem by a screw 32 so that the stem 18 is positively rotatable by the hand grip member.

Positioned at diametrically opposite points relative to the valve member and spaced circumferentially and laterally thereof, there are supporting bosses 33, 34 which are rigid with the casing 1, the boss 33 being joined to the side wall 24 and the boss 34 being secured to the valve housing 4. The upper ends of the bosses 33, 34 are longitudinally screw-threaded to receive upwardly extending screw-threaded rods or posts 35, 36 respectively. Each of the posts 35, 36 has an elongated cylindrical pilot end extension 36ª which fits in a guide bore in each of the bosses 33, 34 to hold the posts against lateral play. The post 35 extends upward through aligned apertures 37, 38 in the bridge member 21 and cover member 27 respectively, the aperture 38 providing guide means for the upper end of post 35 which is provided with a screw driver receiving and adjusting slot 38ª. The post 36 extends upward through apertures 39 and 40 in the bridge member 21 and cover member 27 respectively, the aperture 40 providing a guide means for the upper end of post 36 which is provided with a screw driver receiving and adjusting slot 41.

The cam means for operating the valve member comprises a follower member 42 cooperable with cam track members 43, 44 carried by or on the posts 35, 36. The follower member 42 may be a short cylindrical rod projecting radially from the valve stem between the valve housing 4 and bridge member 21. The track members 43, 44 are of resilient sheet material preferably annealed sheet steel. The track member 43 (Fig. 6) has a curved track portion 45 of helical form with a low point or portion 46 and a high point or portion 47 at its opposite ends. Projecting from the track member 43 adjacent the low portion 46 there is a positioning and supporting ear 48 which member by a narrow or thin portion 51ª of reduced cross-section so that the track member will flex at the portion or section 51ª upon adjustment of the track member. The track member portion 45 which is formed as a portion of an annulus is concentric with the valve member 11 and therefore partially surrounds the same. Projecting upward from the ear 50 at its side opposite the track portion there is a stop arm or member 52 which extends through the bridge member aperture 39 and is parallel to and spaced laterally from the post 36.

The track member 44 has a track portion which is of generally arcuate form in plan view and terminates at its ends in positioning and supporting ears 53, 54 respectively, the ear 53 having a cylindrical aperture 55 to receive and fit the post 35 and the ear 54 having an elongated aperture 56 to receive the post 36 and provide for adjustment, the ear 53 overlying the ear 48. Intermediate its ends the track member 44 has a downward stepped or offset portion providing steps 57, 58, the riser portion of the upper step 57 substantially abutting the low end of track member 43 and cooperating with the low point 46 to form a stop shoulder at the low end of the track portion 45. The downward facing horizontal or tread portion of step 58 cooperates with the follower member 42 to lock or hold the conical valve portion 12 tightly against its seat 9. The arcuate or curved end portions of the track member 44 provide sufficient flexibility so that the step 58 can move upward to receive the follower member 42 and thereby resiliently press the valve to its seat. The riser portion 59 of the step 58 serves as an abutment or stop for engagement by the follower member 42 to limit final rotary movement of the valve member when it has been seated in full closed position.

Secured on the posts 35, 36 there are abutment members or collars 60, 61 respectively, providing downward facing shoulders and having stop fingers 62, 63 respectively. These abutment members are of similar construction and therefore the description of one will suffice for both. The member 61 (Fig. 5) comprises a sleeve member 64 which fits the post 36 and against which the track member 43 abuts upwardly. The member 64 is held in its position on the post by a flanged member 65 from which the stop finger 63 extends for engagement with the stop arm 52. With the stop finger 63 positioned as shown, Fig. 2, in engagement with the rear edge of stop arm 52, the member 65 is moved up or down on post 36 until, with the follower member 42 at the track high point 47, the valve member 11 will have its maximum desired open position. The flanged member 65 is then permanently secured to the as shown in Fig. 2 and with the follower member 42 on the cam low point 46 and against step 57, the cam low point 46 is positioned to obtain the largest minimum or maximum pilot flow desired through slot 14. The abutment member 60 is then soldered or otherwise securely fastened to the post 35 and thereafter upon rotation of post 35 in a clockwise direction facing Fig. 2 the cam low point 46 will be lowered thereby decreasing the rate of minimum or pilot flow through the valve. The clockwise adjustment of post 35 and the lowest flow rate obtainable by this adjustment is limited by engagement of the finger 62 with the casing wall 24. The cam track members 43, 44 are held up against abutment member 60 by a coil spring 68 which surrounds post 35 and seats on the upper end of boss 33. The springs 67 and 68 are under compression and exert sufficient force to hold the ends of the track members 43, 44 normally in rigid fixed position. Upon rotation of post 35 to adjust the cam low point 46, the track member 43 will be flexed at the section 51$^a$ so that the cam high point 47 will remain in its fixed position. Upon rotary adjustment of post 36, the track member 43 will flex at the section 49$^a$ so that the position of the cam low point 46 will remain fixed as the high point is varied or moved. The underside or follower engagement face of track portion 45 is provided with radial serrations or notches 69 spaced equally a distance "$y$" which may be 5° (see Fig. 8). These serrations are preferably only deep enough to hold the follower member against shifting from its set position which might result from vibration or touching of the grip member 31.

In order to limit the opening movement of the valve and prevent rotational movement of the follower member 42 beyond the high point 47 a stop member 70 is provided. This stop member 70 extends downward from the bridge member 21 and is preferably curved in horizontal cross-section so that it partially surrounds the valve member 11 and has one vertical side edge 71 aligned with and substantially abutting the high point end of track portion 45 and has its other vertical side edge 72 substantially abutting the stop shoulder 59 (see Fig. 4). The member 70 extends downward sufficiently so that the follower member cannot by downward reciprocation of the valve stem upon compression of the spring 15 be thereafter rotated in further counterclockwise movement.

In Fig. 9 there is shown a modification of the cam track supporting means in which the sleeve member 64 of Fig. 5 is formed integral with the post 36, as at 75, for rotation therewith or if desired, the sleeve member 64 may be initially pinned or otherwise rigidly fixed to the post 36. In establishing the limited range of adjustment of the cam high point 47, the post 36 is rotated in its threaded socket to move the abutment 75 up or down with respect to the valve port. When the cam high point is in the desired position for maximum safe opening of the valve member then the flanged stop member 65, with its stop finger 63 positioned as shown in Figs. 2 and 5, is soldered or otherwise secured rigidly to the post 36. The fixing of the flanged member 65 to the post holds the post against adjustment to raise the high end of the track member since finger 63 is against stop arm 52 and also limits the range of adjustment of the high end of the cam high point 47 in a downward direction by engagement of finger 63 with the other side of stop arm 52 when the post 36 has been rotated clockwise through substantially a complete revolution. The supporting post 35 and its abutment means 60 may likewise be made similar to the showing of Fig. 9 and its establishment of a desired position for the low point 46 of the cam track is similar to that above described with respect to the high point setting in Fig. 9 and therefore a detail showing or description of this low point establishing means is not given.

The operation of the valve is as follows: With the constant level chamber connected to a suitable source of oil supply and the outlet 3 connected to the burner or the like, the low point 46 is adjusted within the minimum limit range by rotation of post 35 to provide proper flow through slot 14 for pilot fire and the cam high point 47 is adjusted by rotation of post 36 within its range of maximum adjustment to determine the maximum flow rate through slots 13 to the burner. Either the minimum or the maximum open position of the valve may be thus adjusted as above described without altering the other position. The valve member 11, as above noted, is urged to its seat by the resilience of track member 44 and the spring 67 so that the step shoulder 58 which has been lifted by the follower member 42 is acting through the follower member 42 to hold the valve member tightly seated. As the valve member is rotated by hand grip 31 in counterclockwise direction or toward open position any dirt on the seat will be sheared by rotation of the spring loaded valve. When follower member 42 passes from under the track portion 58 which leads it to the cam low point 46, the valve member will have a quick opening movement as the follower member rises to engage the cam low point. There will now be pilot flow at the minimum desired rate through the pilot slot 14. As the follower member 42 leaves the track member 44, the track member 44 may have some downward movement but this will not disturb the setting of the cam low point which is at all times held in set position by spring 68 and the opposing abutment member 60. The valve member is now freely movable toward further open position under the force of spring 15 as the follower member is moved counterclockwise along the underface of track portion 45, the serrations 69 not being of sufficient depth to impede the continuous rotation of the valve member. When the valve member has been moved to full open position as determined by the positioning of abutment member 61, then the follower member 42 will be on the cam high point 47 and substantially in engagement with the stop member 70.

What I claim and desire to secure by Letters Patent of the United States is:

1. A valve comprising a casing having a port, a reciprocal valve member controlling flow through said port, cam means determining the position of said valve member relative to said port, said cam means comprising a track member and a follower member, means securing said track member at one portion thereof to said casing, said track member having an aperture through another portion thereof, a supporting post screw-threaded to said casing and extending through said track member aperture, means on said post abutting said track member, a coil spring surrounding said post and holding said track member against said abutting means, said post being adjustable so that at least a portion of said track member can be changed in its position relative to said valve member to determine the operation of said valve member by said cam means.

2. A valve comprising a casing having a port, a reciprocal valve member controlling flow through said port, cam means determining the position of said valve member relative to said port, said cam means comprising a track member and a follower member, means securing said track member at one portion thereof to said casing, a supporting rod secured to said casing, an abutment member longitudinally adjustable along said rod and engaging another portion of said track member, a spring on said rod and holding said track member against said abutment member, and means to fix the position of said abutment member on said rod and relative to said port to determine a position of said valve member.

3. A valve comprising a casing having a port, a reciprocal valve member controlling flow through said port, cam means determining the position of said valve member relative to said port, said cam means comprising a track member and a follower member, means securing said track member at one portion thereof to said casing, a supporting rod adjustably secured to said casing and having a limited range of adjustment, an abutment member relatively movable to and on said rod and engaging another portion of and for positioning said track member, and means to fix said abutment member in position on said rod to determine the permissible adjustment of said track member by said rod.

4. A valve comprising a casing having a port, a reciprocal valve member controlling flow through said port, cam means determining the position of said valve member relative to said port, said cam means comprising a track member and a follower member, means securing said track member at one portion thereof to said casing, a supporting rod adjustably secured to said casing, an abutment member movable on and relative to said rod and engaging another portion of said track member, means securing said abutment member in a desired position on said rod to determine a range of operation of said valve member, a stop member movable with said abutment member, and fixed means engageable by said stop member to limit the adjustment of said valve member by said rod within said range.

5. A valve comprising a casing having a port, a reciprocal valve member controlling flow through said port, cam means determining the position of said valve member relative to said port, said cam means comprising a track member and a follower member, and a second track member independent of said first-named track member and aligned with and leading to said first named track member and having a resiliently urged offset portion cooperable with said follower member to hold resiliently said valve member tightly in closed position.

6. A valve comprising a casing having a port, a reciprocal valve member controlling flow through said port, cam means determining the position of said valve member relative to said port, said cam means comprising a track member and a follower member, a second track member aligned with and leading to said track member and having an offset portion cooperable with said follower member to hold said valve member tightly in closed position, and a coil spring acting on said second track member to hold said offset portion in a valve closing position.

7. A valve comprising a casing having a port, a reciprocal valve member controlling flow through said port, cam means determining the position of said valve member relative to said port, said cam means comprising a track member and a follower member, a plurality of supporting posts spaced laterally of and circumferentially of said valve member, said track member being apertured to receive said posts, abutment means on certain of said posts for engaging said track member, and a coil spring on each of said certain posts and resiliently holding said track member against said abutment means.

8. A valve comprising a casing having a port, a reciprocal valve member controlling flow through said port, cam means determining the position of said valve member relative to said port, said cam means comprising a track member and a follower member, a plurality of supporting posts spaced laterally of and circumferentially of said valve member, said track member being apertured to receive said posts, abutment means on certain of said posts for engaging said track member, means holding said track member against said abutment means, means establishing a position of said abutment means relative to said port to determine the minimum open position of said valve member when said follower member is in engagement with the low point of said track member, and means establishing a position of another of said abutment means relative to said port to determine the maximum open position of said valve member when said follower member is in engagement with the high point of said track member.

9. A valve comprising a casing having a port, a reciprocal valve member controlling flow through said port, cam means determining the position of said valve member relative to said port, said cam means comprising a track member and a follower member, a plurality of adjustable supporting posts spaced laterally of and circumferentially of said valve member, said track member being apertured to receive said posts, abutment means on certain of said posts for engaging said track member, means holding said track member against said abutment means, means establishing a desired position of one of said abutment means to determine the minimum open position of said valve member when said follower member is in engagement with the low point of said track member, means cooperable with said one of said abutment means to limit the adjustment of said minimum open position, means establishing a desired position of another of said abutment means to determine the maximum open position of said valve member when said follower member is in engagement with the high point of said track member, and means cooperable with said other of said abutment means to limit the adjustment of said maximum open position.

10. A valve comprising a casing having a port, a reciprocal valve member controlling flow through said port, cam means determining the position of said valve member relative to said port, said cam means comprising a track member and a follower member, a plurality of supporting posts spaced laterally of and circumferentially of said valve member and having each a downward facing shoulder, said track member surrounding at least in part said valve member and having apertures receiving certain of said posts, a second track member having an offset portion and leading to said first-named track member, said second track member surrounding at least in part said valve member and having apertures receiving certain of said posts, a coil spring on one of said posts and holding said first-named and said second-named track members against one of said shoulders, spring means urging said offset portion toward said port and urging said first-named track member against another of said shoulders, said offset portion cooperating with said follower member to hold said valve member tightly in closed position, and means extending at least in part around said valve member and between said track members and blocking rotational movement of said follower member off the high point of said first-named track member.

11. A valve comprising a casing having a port, a reciprocal valve member controlling flow through said port, cam means determining the position of said valve member relative to said port, said cam means comprising a track member and a follower member, a pair of adjustable supporting posts spaced laterally of and circumferentially of said valve member and each having a downward facing shoulder, said track member surrounding at least in part said valve member and having apertures receiving said posts, a second track member having an offset portion and leading to said first-named track member, said second track member surrounding at least in part said valve member and having apertures receiving said posts, a coil spring on one of said posts and holding said first-named and said second-named track members against one of said shoulders, a coil spring on the other of said posts and positioned between said track members and urging said second-named track member toward said port and said first-named track member against the other of said shoulders, said posts upon adjustment acting to change the position of said first-named track member relative to said port, said first-named track member having flexible portions adjacent said posts so that the ends of said first-named track member are freely adjustable relative to each other, said offset portion cooperating with said follower member to hold said valve member tightly in closed position, and means extending at least in part around said valve member and between said track members and blocking rotational movement of said follower member off the high point of said first-named track member.

12. A valve for metering oil flow comprising a casing having an outlet port with a seat, a valve member guided in said port and having a metering slot, a rotary and longitudinally reciprocal stem on said valve member and extending upward in said casing, a cover member on said casing and having an aperture aligned with said port, a hand grip member external of said cover member and secured to said stem, supporting bosses projecting from and within said casing and spaced laterally from and diametrically of said valve member, said cover member having registering apertures therethrough aligned with said bosses, adjustable supporting posts screw-threaded in said bosses and extending upward through said registering apertures, a resilient sheet metal cam track member of helical form and having laterally extending apertured ears receiving said posts, an abutment collar fixed on one of said posts and limiting the upward movement of the high end of said track member, a stop finger projecting from said collar, an upward extending stop arm projecting from said track member adjacent said one post and engageable by said stop finger to limit rotary and longitudinal adjustment of said one post, an abutment collar fixed on the other of said posts and limiting upward movement of the low end of said track member, a stop finger projecting from said collar and engageable with said casing to limit rotary and longitudinal adjustment of said other post, a resilient sheet metal cam track member having a plurality of steps intermediate its ends, said second-named track member having laterally extending apertured ears receiving said posts, a follower member projecting laterally from said stem and engageable with the undersides of said track members, resilient means operable to urge said follower member against said track members, said second-named track member having one end portion overlying the low end of said first-named track member and having one of said steps leading to said low end, a coil spring surrounding said other post and acting to hold said track members against said second-named collar, a coil spring surrounding said one post and positioned between said track members to urge said first-named track member against said first-named collar and to urge said steps toward said port, a lower one of said steps cooperating with said follower member to lock said valve member tightly against said seat, and a plate-like stop member substantially filling the space between the high end of said first-named track member and said lower one of said steps and stopping rotary movement of said follower member and said valve member beyond the high end of said first-named track member.

13. A valve comprising a casing having a port, a reciprocal valve member controlling flow through said port, cam means determining the position of said valve member relative to said port, said cam means comprising a track member and a follower member, said track member being of bendable sheet material and having a supporting portion and a cam portion, said supporting portion being laterally offset from the side edge of said track member so that said track member is clear of obstruction to said follower member, and means securing said supporting portion in a plane substantially normal to the path of movement of said valve member, said supporting portion being bent to incline said cam portion.

14. A valve comprising a casing having a port with a seat, a reciprocal valve member controlling flow through said port and engageable with said seat, cam means determining the position of said valve member relative to said seat, said cam means comprising a track member and a follower member, a spring urging said track and follower members into engagement and said valve member away from said seat, said track member having a resiliently supported stepped portion having a greater resistance to movement than the resistance of said spring and engageable with said follower member, said follower member being operable to engage and stress said stepped portion upon engagement of said valve member with said seat so that said valve member is resiliently held against said seat in opposition to said spring and in closed position.

15. A valve comprising a casing having a port, a reciprocal valve member controlling flow through said port, cam means determining the position of said valve member relative to said port, said cam means comprising a pair of track members and a follower member, a supporting post on said casing, one of said track members extending from the other and providing a track with overlying ends and surrounding said valve member, said ends being apertured and receiving said post, and a helical coil spring surrounding said post between said track member ends, said spring acting to hold one track end against said casing and to support the other track end.

16. A valve comprising a casing having a port, a reciprocal valve member controlling flow through said port, cam means determining the position of said valve member relative to said port, said cam means comprising a track member and a follower member movable relative to each other, and a resiliently-urged track member portion leading to said track member and having predetermined spacing from said port, said follower member being operable upon said relative movement to engage said track portion so that said track portion acts to hold said valve member tightly in closed position.

17. A valve comprising a casing having a port, a reciprocal valve member controlling flow through said port, cam means determining the position of said valve member relative to said port, said cam means comprising a pair of track members and a follower member, a supporting post on said casing, one of said track members extending from the other and providing a track with overlying ends and surrounding said valve member, said ends being apertured and receiving said post, a helical coil spring surrounding said post between said track member ends, said spring acting to hold one track end against said casing and to support the other track end, and an abutment member longitudinally adjustable on said post and holding said other track end against the force of said spring.

18. A valve comprising a casing having a port with a seat, a reciprocal valve member controlling flow through said port and engageable with said seat, a cam follower member projecting from said valve member, a sheet material cam track member cooperable with said follower member and having a shoulder resiliently urged toward said seat and spaced from said seat a distance less than the spacing of said follower member therefrom so that upon engagement of said shoulder and said follower member, said shoulder can move away from said seat and hold said valve member resiliently tightly against said seat.

CHARLES M. WILLIAMS.